United States Patent
Kumar et al.

(10) Patent No.: US 9,453,443 B2
(45) Date of Patent: Sep. 27, 2016

(54) EMISSIONS TREATMENT SYSTEM WITH LEAN NOX TRAP

(75) Inventors: Sanath V. Kumar, Hillsborough, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 1498 days.

(21) Appl. No.: 12/727,473

(22) Filed: Mar. 19, 2010

(65) Prior Publication Data

US 2010/0236224 A1 Sep. 23, 2010

Related U.S. Application Data

(60) Provisional application No. 61/161,861, filed on Mar. 20, 2009.

(51) Int. Cl.
| | |
|---|---|
| *F01N 3/00* | (2006.01) |
| *F01N 3/08* | (2006.01) |
| *F01N 3/033* | (2006.01) |
| *F01N 3/035* | (2006.01) |
| *F01N 3/20* | (2006.01) |
| *F01N 3/22* | (2006.01) |
| *F01N 13/00* | (2010.01) |

(Continued)

(52) U.S. Cl.
CPC ......... *F01N 3/0807* (2013.01); *B01D 53/9477* (2013.01); *F01N 3/033* (2013.01); *F01N 3/035* (2013.01); *F01N 3/0814* (2013.01); *F01N 3/0821* (2013.01); *F01N 3/206* (2013.01); *F01N 3/2066* (2013.01); *F01N 3/2073* (2013.01); *F01N 3/22* (2013.01); *F01N 13/009* (2014.06); *B01D 53/9422* (2013.01); *B01D 53/9472* (2013.01); *B01D 53/9481* (2013.01); *B01D 2251/208* (2013.01); *B01D 2251/2062* (2013.01); *B01D 2251/2067* (2013.01); *B01D 2255/1021* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/9032* (2013.01); *B01D 2255/91* (2013.01); *B01D 2255/9155* (2013.01); *B01D 2258/012* (2013.01); *F01N 3/30* (2013.01); *F01N 2250/02* (2013.01); *F01N 2250/12* (2013.01); *F01N 2250/14* (2013.01); *F01N 2270/04* (2013.01); *F01N 2570/14* (2013.01); *F01N 2570/18* (2013.01); *F01N 2610/03* (2013.01); *F01N 2610/04* (2013.01); *F01N 2610/05* (2013.01); *Y02T 10/24* (2013.01)

(58) Field of Classification Search
CPC .. F01N 13/009; F01N 3/033; B01D 53/9477
USPC .......................................................... 60/286
See application file for complete search history.

(56) References Cited

U.S. PATENT DOCUMENTS

| | | |
|---|---|---|
| 4,522,894 A | 6/1985 | Hwang et al. |
| 6,001,318 A * | 12/1999 | Tillaart et al. ................ 423/212 |
| 6,105,365 A | 8/2000 | Deeba et al. |

(Continued)

*Primary Examiner* — Jason Shanske
(74) *Attorney, Agent, or Firm* — Womble Carlyle Sandridge & Rice LLP

(57) ABSTRACT

Systems and methods for abating NOx in an exhaust stream are provided. System using a lean NOx trap, an air injector and optional catalysts and filters are described. The emissions treatment system is advantageously used for the treatment of exhaust streams from diesel engines and lean burn gasoline engines.

19 Claims, 5 Drawing Sheets

(51) Int. Cl.
*B01D 53/94* (2006.01)
*F01N 3/30* (2006.01)

(56) References Cited

U.S. PATENT DOCUMENTS

| | | |
|---|---|---|
| 6,176,078 B1 | 1/2001 | Balko et al. |
| 6,662,553 B2 | 12/2003 | Patchett et al. |
| 6,914,026 B2 | 7/2005 | Tran et al. |
| 7,213,395 B2 | 5/2007 | Hu et al. |
| 2002/0004024 A1 | 1/2002 | Hertzberg |
| 2004/0112043 A1 | 6/2004 | Matsubayashi et al. |
| 2004/0254073 A1* | 12/2004 | Wei et al. ............... 502/527.12 |
| 2005/0198943 A1* | 9/2005 | Breuer et al. ................. 60/286 |
| 2006/0010859 A1* | 1/2006 | Yan et al. ...................... 60/286 |
| 2006/0153761 A1* | 7/2006 | Bandl-Konrad et al. .. 423/239.1 |
| 2007/0028601 A1* | 2/2007 | Duvinage et al. ............. 60/286 |
| 2007/0175208 A1* | 8/2007 | Bandl-Konrad et al. ....... 60/286 |

* cited by examiner

EMISSIONS TREATMENT SYSTEM WITH LEAN NOX TRAP

CROSS-REFERENCE TO RELATED APPLICATIONS

This application claims the benefit of priority under 35 USC §119(e) to U.S. Provisional Application Ser. No. 61/161,861, filed Mar. 20, 2009, which is incorporated herein by reference.

TECHNICAL FIELD

The present invention relates to emissions treatment systems having lean NOx traps (LNT) and downstream oxidation catalysts, and methods useful for reducing contaminants in exhaust gas streams, especially exhaust gas streams containing nitrogen oxides (NOx).

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. Effective abatement of NOx from lean burn engines is difficult to achieve because high NOx conversion rates typically require reductant-rich conditions. Conversion of the NOx component of exhaust streams to innocuous components generally requires specialized NOx abatement strategies for operation under fuel lean conditions.

One such strategy for the abatement of NOx in the exhaust stream from lean burn engines uses NOx storage reduction (NSR) catalysts, which are also known in the art as "lean NOx traps (LNT)." NSR catalysts contain NOx sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to $NO_2$ (Equation 1), which is an important step for NOx storage. At low temperatures, this reaction is typically catalyzed by the platinum group metal component, e.g., a platinum component. The oxidation process does not stop here. Further oxidation of $NO_2$ to nitrate, with incorporation of an atomic oxygen, is also a catalyzed reaction (Equation 2). There is little nitrate formation in absence of the platinum group metal component even when $NO_2$ is used as the NOx source. The platinum group metal component has the dual functions of oxidation and reduction. For its reduction role, the platinum group metal component first catalyzes the release of NOx upon introduction of a reductant, e.g., CO (carbon monoxide), $H_2$ (hydrogen) or HC (hydrocarbon) (Equation 3) to the exhaust. This step may recover some NOx storage sites but does not contribute to any reduction of NOx species. The released NOx is then further reduced to gaseous $N_2$ in a rich environment (Equations 4 and 5). NOx release can be induced by fuel injection even in a net oxidizing environment. However, the efficient reduction of released NOx by $H_2$, CO or HC requires overall net rich conditions. A temperature surge can also trigger NOx release because metal nitrate is less stable at higher temperatures.

NOx trap catalysis is a cyclic operation. Metal compounds are believed to undergo a carbonate/nitrate conversion, as a dominant path, during lean/rich operations.

Oxidation of NO to $NO_2$ $$NO + \tfrac{1}{2}O_2 \rightarrow NO_2 \qquad (1)$$

NOx Storage as Nitrate $$2NO_2 + MCO_3 + \tfrac{1}{2}O_2 \rightarrow M(NO_3)_2 + CO_2 \qquad (2)$$

NOx Release $$M(NO_3)_2 + 2CO \rightarrow MCO_3 + NO_2 + NO + CO_2 \qquad (3)$$

NOx Reduction to $N_2$ $$NO_2 + CO \rightarrow NO + CO_2 \qquad (4)$$

$$2NO + 2CO \rightarrow N_2 + 2CO_2 \qquad (5)$$

In Equations 2 and 3, M represents a divalent metal cation. M can also be a monovalent or trivalent metal compound in which case the equations need to be rebalanced.

While the reduction of NO and $NO_2$ to $N_2$ occurs in the presence of the NSR catalyst during the rich period, it has been observed that ammonia ($NH_3$) can also form as a by-product of a rich pulse regeneration of the NSR catalyst. For example, the reduction of NO with CO and $H_2O$ is shown below in equation (6).

Reduction of NO to $NH_3$ $$2NO + 5CO + 3H_2O \rightarrow 2NH_3 + 5CO_2 \qquad (6)$$

It is likely that this $NH_3$ formation reaction happens by a consecutive series of reactions where $H_2$ is first formed by the water gas shift reaction (7) and $NH_3$ is formed by reaction of $H_2$ with NO released from the NSR catalyst.

Water Gas Shift Reaction $$CO + H_2O \rightarrow H_2 + CO_2 \qquad (7)$$

Reduction of NO to $NH_3$ with $H_2$ $$2NO + 5H_2 \rightarrow 2NH_3 + 2H_2O \qquad (8)$$

This property of the NSR catalyst mandates that $NH_3$, which is itself a noxious component, must also now be converted to an innocuous species before the exhaust is vented to the atmosphere.

An alternative strategy for the abatement of NOx under development of mobile applications (including treating exhaust from lean burn engines) uses selective catalytic reduction (SCR) catalyst technology. The strategy has been proven effective as applied to stationary sources, e.g., treatment of flue gases. In this strategy, NOx is reduced with a reductant, e.g., $NH_3$, to nitrogen ($N_2$) over an SCR catalyst that is typically composed of base metals. This technology is capable of NOx reduction greater than 90%, thus it represents one of the best approaches for achieving aggressive NOx reduction goals.

Ammonia is one of the most effective reductants for NOx at lean condition using SCR technologies. One of the approaches being investigated for abating NOx in diesel engines (mostly heavy duty diesel vehicles) utilizes urea as a reductant. Urea, which upon hydrolysis produces ammonia, is injected into the exhaust in front of an SCR catalyst in the temperature range 180-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

As the conditions that emission treatment systems operate under vary for different vehicles powered by lean burn engines, flexible approaches for the design of emission treatment systems are needed to achieve ever more stringent requirements for NOx abatement. In particular, approaches that account for the effect on NOx storage and $NH_3$ formation during lean and rich periods of operation of altering the NSR catalyst composition offer more reliable and practical pathways to achieving this goal.

SUMMARY

Provided are emissions treatment systems that can be used for treating exhaust gas from diesel engines and lean burn gasoline engines, and methods of using these systems to treat internal combustion engine exhaust.

One or more embodiments of the invention are directed to emissions treatment systems for NOx abatement in a diesel exhaust stream from a diesel engine. The emissions treatment system includes a lean NOx trap (LNT) located downstream of the engine and an air injector to reduce hydrocarbons located downstream of the LNC.

In an embodiment, the air injector is one or more of a valve, pump or scoop. In one embodiment, the system further comprises a catalyzed soot filter. In an embodiment, the system further comprises a diesel oxidation catalyst located upstream of the catalyzed soot filter. In one variant, the diesel oxidation catalyst is integrated with the catalyzed soot filter. In another variant, the lean NOx trap is integrated with the catalyzed soot filter.

In one embodiment, the system further comprises an ammonia oxidation catalyst located downstream of the air injector to reduce ammonia slipping from the LNT. In one or more embodiments, the system comprises a selective catalytic reduction catalyst located downstream of the air injector and upstream of the ammonia oxidation catalyst. In one or more embodiments, the system further comprises a catalyzed soot filter located downstream of the air injector. In one or more embodiments, the SCR catalyst is integrated with the catalyzed soot filter. In one or more embodiments, the AMOX catalyst is integrated with the catalyzed soot filter. In one or more embodiments, both the SCR catalyst and the AMOX catalyst are integrated with the catalyzed soot filter.

In one or more embodiments, the system further comprises a reductant injector located upstream of the LNT catalyst. In one variant of embodiments including a reductant injector, the reductant injector injects fuel into the exhaust stream or an engine cylinder. In one or more embodiments the LNT catalyst is adapted to form ammonia in situ.

One aspect of the invention pertains to methods of abating NOx in an emission stream. In one or more embodiments comprise passing the emission stream through a lean NOx trap and injecting air in the stream exiting the LNT catalyst. In an embodiment, the method further comprises passing the exhaust stream through a catalyzed soot filter prior to the LNT. In or more method embodiments, the exhaust emission stream can be passed through any of the systems described herein. Thus, in one embodiment, the method further comprises passing the exhaust stream through a diesel oxidation catalyst prior to the catalyzed soot filter. In one or more method embodiments, the diesel oxidation catalyst is integrated with the catalyzed soot filter. One or more method embodiments further comprise passing the air injected gas stream through an ammonia oxidation catalyst and passing the air injected exhaust stream through a selective catalytic reduction catalyst before passing through the ammonia oxidation catalyst.

The various embodiments of the invention may include, in a multitude of configurations, various components including, but not limited to, diesel oxidation catalysts, catalyzed soot filters, selective catalytic reduction catalysts, ammonia oxidation catalysts and reductant injectors. The exhaust gas may be passed through these optional components in a variety of sequences.

DETAILED DESCRIPTION

Figure 1:
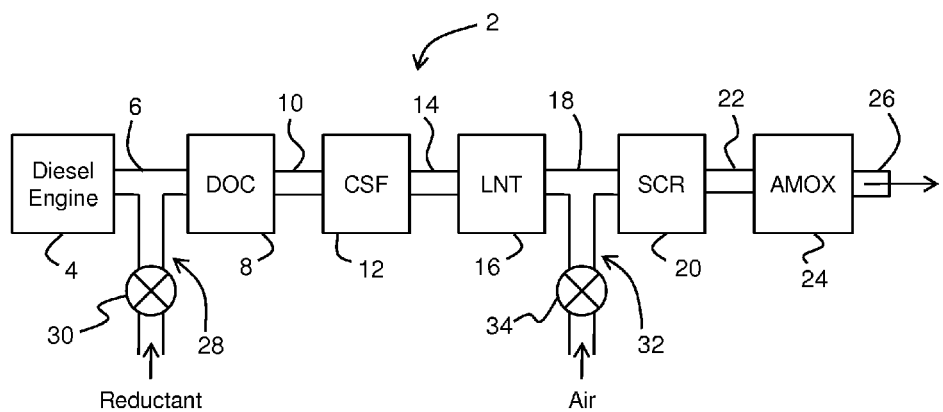
FIG. 1 is a schematic view showing an engine emission treatment system according to a detailed embodiment.

The invention relates to an emissions treatment system effective for the treatment of the components of exhaust gases from lean burn engines including unburned gaseous hydrocarbons, carbon monoxide, particulate matter (e.g., in diesel exhaust) and especially, NOx. The system has an upstream ammonia-generating catalyst, such as a lean NOx trap with dual catalytic function, and a downstream SCR catalyst, and is operated with alternating lean and rich exhaust gases. The LNT catalyst promotes the storage of NOx during a lean period of operation ($\lambda>1.0$) according to equations (1) and (2), and during a rich period ($\lambda<1.0$), it catalyzes not only the reduction of stored NOx to $N_2$ (equation 5), but also the formation of $NH_3$ from both gaseous NOx and stored NOx (equation 6). The formation of $NH_3$ is impacted by such factors as $\lambda$, rich/lean time ratio, reducing gases, age of catalyst, and the like. Thus, the LNT provides both NOx abatement and $NH_3$ generation. The approaches described herein offer a flexible, efficient and predictable approach for designing emissions treatment systems capable of accommodating exhaust gases emitted from a variety of lean burn engines, including diesel engines and lean burn gasoline engines.

The following terms shall have, for the purposes of this application, the respective meanings set forth below.

"Lean gaseous streams" including lean exhaust streams mean gas streams that have a $\lambda>1.0$.

"Lean periods" refer to periods of exhaust treatment where the exhaust gas composition is lean, i.e., has a $\lambda>1.0$.

"Platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Rich gaseous streams" including rich exhaust streams mean gas streams that have a λ<1.0.

"Rich periods" refer to periods of exhaust treatment where the exhaust gas composition is rich, i.e., has a λ<1.0.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

Reference to an "ammonia-generating component" means a part of the exhaust system that supplies ammonia ($NH_3$) as a result of its design and configuration driven by engine-out emissions and dosing of reductant ($H_2$, CO and/or HC) via engine management or via injection into exhaust. Such a component excludes gas dosing or other externally supplied sources of $NH_3$. Examples of ammonia-generating components include NOx storage reduction (NSR) catalysts, lean NOx trap (LNT) catalysts, and hydrocarbon-fed Selective Catalytic Reduction (HC—SCR) catalysts.

In a broad aspect an embodiment of the invention pertains to injecting air downstream from a lean NOx trap in an engine exhaust treatment system. As will be appreciated in a lean burn engine such as diesel engines, it is likely that other components will be included in the system, for example, an oxidation catalyst and a particulate filter.

A system comprising a NOx trap is proposed as an emission control solution for Heavy Duty Diesel Engines. The NOx trap is regenerated periodically by creating a reducing atmosphere. This means that additional fuel, or other reductant, may have to be injected (or introduced) into the exhaust stream to consume the excess oxygen typically found in diesel engine exhaust. One of the challenges with using a NOx trap is control of HC and CO during the relatively long rich periods required to purge the NOx trap. One way of solving this problem is by the injection of secondary air, after the LNT, which would enable oxidation of the hydrocarbons and CO emitted during the rich operation, thereby enabling the complete system to meet emissions regulations.

The large amounts of $NH_3$ can be formed over the LNT during the rich transient can be consumed by providing a combination of an SCR catalyst and Ammonia Oxidation Catalyst (AMOX), or by an AMOX itself (with a precious metal component) located downstream from the lean NOx trap. The SCR and/or AMOX would absorb the ammonia emitted by the LNT during rich operation.

A specific way to solve both the rich HC and $NH_3$ release problems would be to combine the two solutions and to inject air downstream from the LNT and to provide at least an AMOX catalyst or an SCR catalyst and an AMOX catalyst downstream from the LNT and the air injector.

FIG. 1 shows a NOx abatement system 2 according to one embodiment. An exhaust gas stream containing gaseous pollutants (e.g., unburned hydrocarbons, carbon monoxide, nitrogen oxides) and particulate matter is conveyed via line 6 from a lean burn engine 4 to an optional diesel oxidation catalyst (DOC) 8. The exhaust stream is next conveyed via line 10 to an optional catalyzed soot filter (CSF) (also referred to as a diesel particulate filter) 12. The CSF 12 can be catalyzed with a soot burning catalyst for regeneration. Exhaust exiting the optional CSF 12 is conveyed by line 14 to a lean NOx trap 16. Some of the NOx during lean periods can remain unadsorbed, resulting in NOx slip. The exhaust stream including NOx slip or $NH_3$, depending on the conditions, is routed through line 18 into an optional SCR catalyst 20. Attached to line 18 may be an air injection 32 which adds air to the exhaust stream. The $NH_3$ is adsorbed in the SCR 20. During lean periods, any NOx slip from the LNT 16 can be reduced to $N_2$ by using the $NH_3$ in the SCR 20. Line 22 may lead to an ammonia oxidation catalyst (AMOX) 24 which oxidizes ammonia which may have slipped from the SCR 20. Line 26 leads to the tail pipe and out of the system.

The lean NOx trap adsorbs NOx during lean periods of engine operation and desorbs NOx during rich periods of engine operation. The NOx desorbed during rich periods is reduced to $N_2$ and $NH_3$.

The air injector 32 can be any suitable device capable injecting air to enter the exhaust stream. Non-limiting examples of suitable air injectors 32 for use with aspects of the invention include valves, pumps, scoops and combinations thereof. Non-limiting examples of suitable air injection systems include secondary air injection, pumped air injection using, for example, vane pumps (e.g. a rotary vane pump), and aspirated air injection systems utilizing an aspirator valve such a reed valve. The air injection 32 may also include a metering device 34 which is operative to allow a known amount of air to enter the system. The metering device 34 may be coupled to a sensor or plurality of sensors (not shown) which may be able to monitor the composition and/or amount of gases in tube 18 to ensure that an appropriate amount of air is being injected into the system.

FIG. 1 also shows an optional reductant injector 28 which is operative to add a reductant to the gas stream upstream of the optional DOC 8. The reductant injector 28 may also include a metering device 30 which is operative to allow a known amount of reductant into the exhaust stream. The metering device 30 may be coupled to a sensor or plurality of sensors (not shown) which are able to monitor the composition of gases in the emission stream in tube 6 to ensure that an appropriate amount of reductant is injected into the system. The reductant injector 28 may be located such that the reductant is injected into the exhaust stream and/or directly into the engine cylinder. According to detailed embodiments of the invention, the reductant is fuel, but other reductants are considered within the scope of the invention, such as nitrogenous reductants including, but not limited to ammonia and ammonia precursors such as urea.

Figure 2:
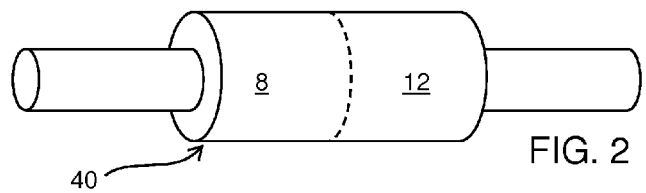
FIG. 2 is a schematic view showing an integrated engine emission treatment system according to an embodiment.
Figure 3:
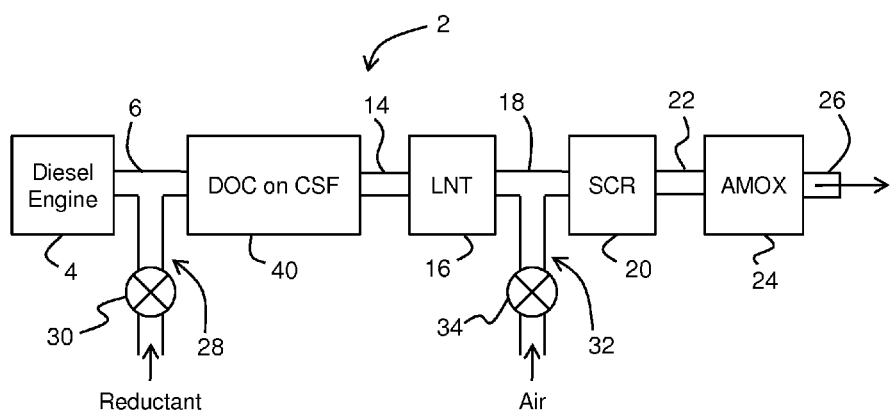
FIG. 3 is an alternative emission treatment system according to one or more embodiments of the invention.

In an alternative embodiment shown in FIGS. 2 and 3, the DOC 8 and CSF 12 may be disposed in separate zones of the same substrate 40, where the DOC is disposed on the upstream segment of the substrate, and the CSF is disposed on the downstream segment.

The optional diesel oxidation catalyst 8, can be made of compositions well known in the art and may comprise base metals (e.g., ceria) and/or platinum group metals as catalytic agents. In the upstream position, the DOC provides several advantageous functions. The catalyst serves to oxidize unburned gaseous and non-volatile hydrocarbons (i.e., the soluble organic fraction of the diesel particulate matter) and carbon monoxide to carbon dioxide and water. Removal of substantial portions of the SOF using the DOC catalyst, in particular, assists in preventing too great a deposition of particulate matter on the NOx trap and SCR catalysts. In another function, a substantial proportion of the NO of the NOx component is oxidized to $NO_2$ in the oxidation catalyst. Increased proportions of $NO_2$ in the NOx component facilitate the trapping and catalytic functions of the NOx trap catalyst as compared to NOx mixtures containing smaller proportions of $NO_2$, as $NO_2$ is generally considered to be a more reactive species than NO.

In certain embodiments of the invention, the DOC is coated on a soot filter, for example, a wall flow filter to assist in the removal of the particulate material in the exhaust stream, and, especially the soot fraction (or carbonaceous fraction) of the particulate material. The DOC, in addition to the other oxidation function mentioned above, lowers the temperature at which the soot fraction is oxidized to $CO_2$ and $H_2O$. As soot accumulates on the filter, the catalyst coating assists in the regeneration of the filter. Although the soot filter may be located downstream of the SCR catalyst it is preferred that the catalyzed soot filter be located upstream of the NOx trap catalyst to minimize or prevent fouling of the NOx trap catalyst and the SCR catalyst downstream with particulate material.

Figure 4:
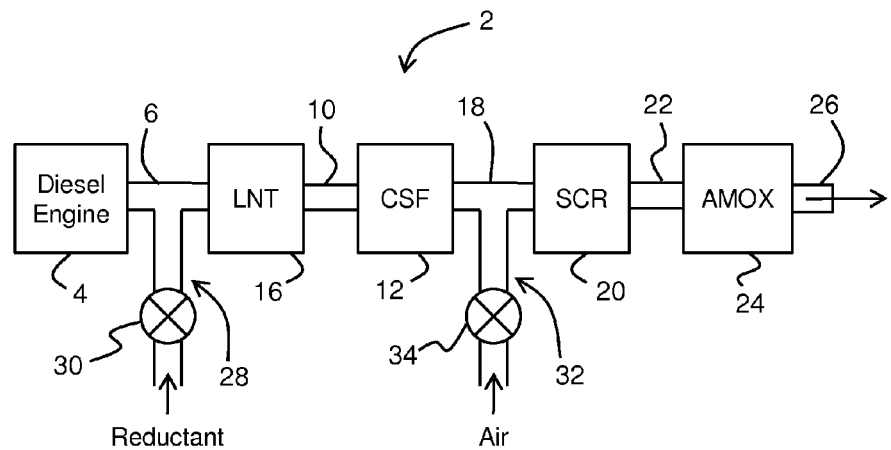
FIG. 4 is an alternative emission treatment system according to one or more embodiments of the invention.
Figure 5:
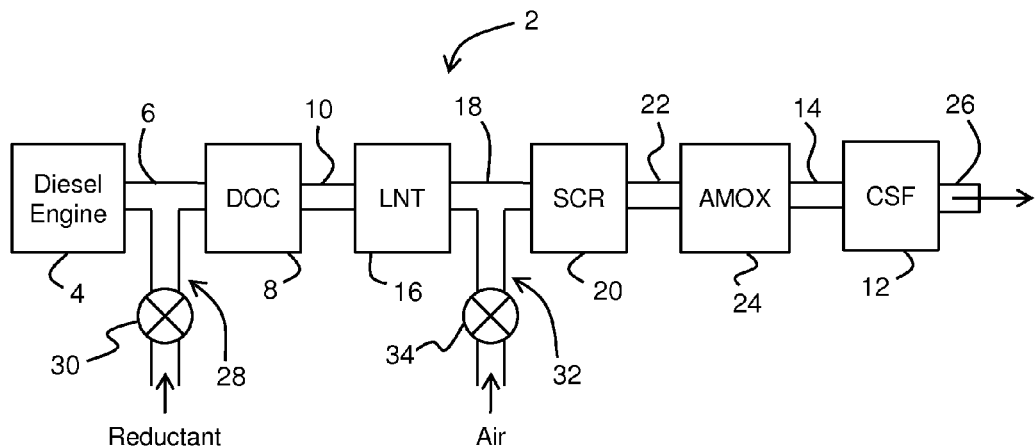
FIG. 5 is an alternative emission treatment system according to one or more embodiments of the invention.
Figure 6:
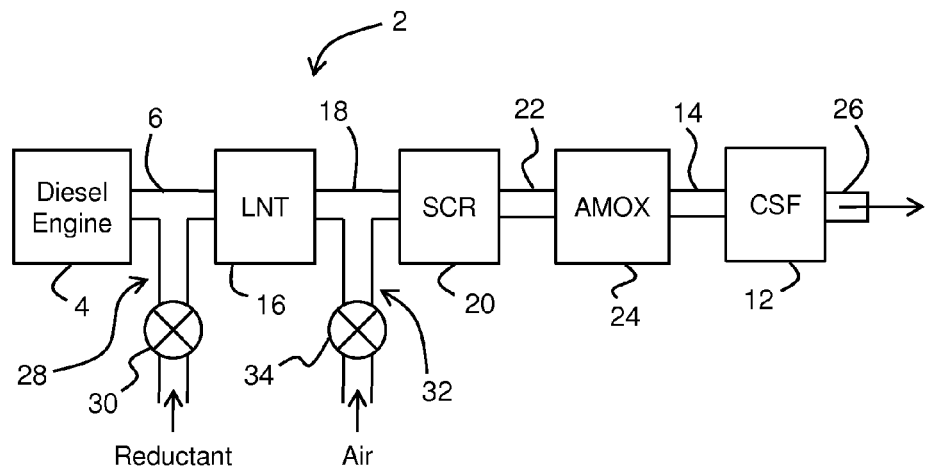
FIG. 6 is an alternative emission treatment system according to one or more embodiments of the invention.
Figure 7:
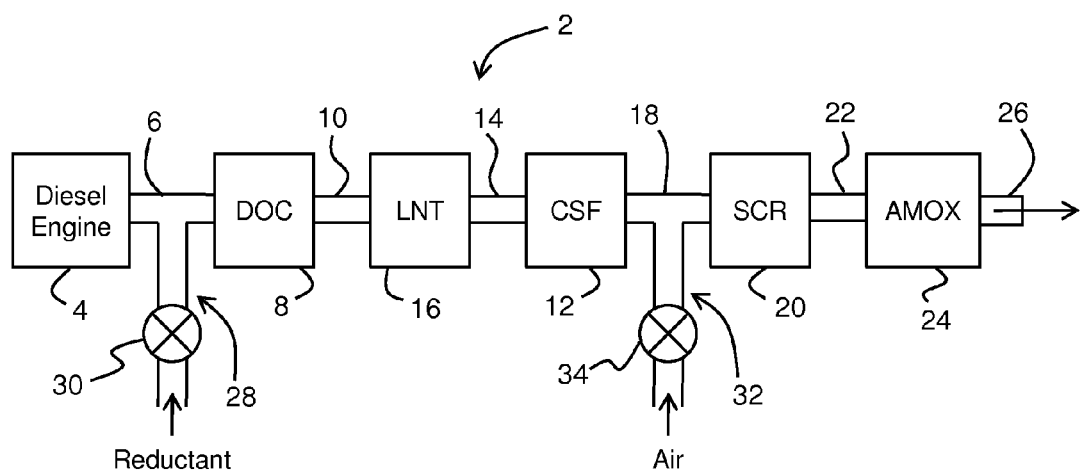
FIG. 7 is an alternative emission treatment system according to one or more embodiments of the invention.
Figure 8:
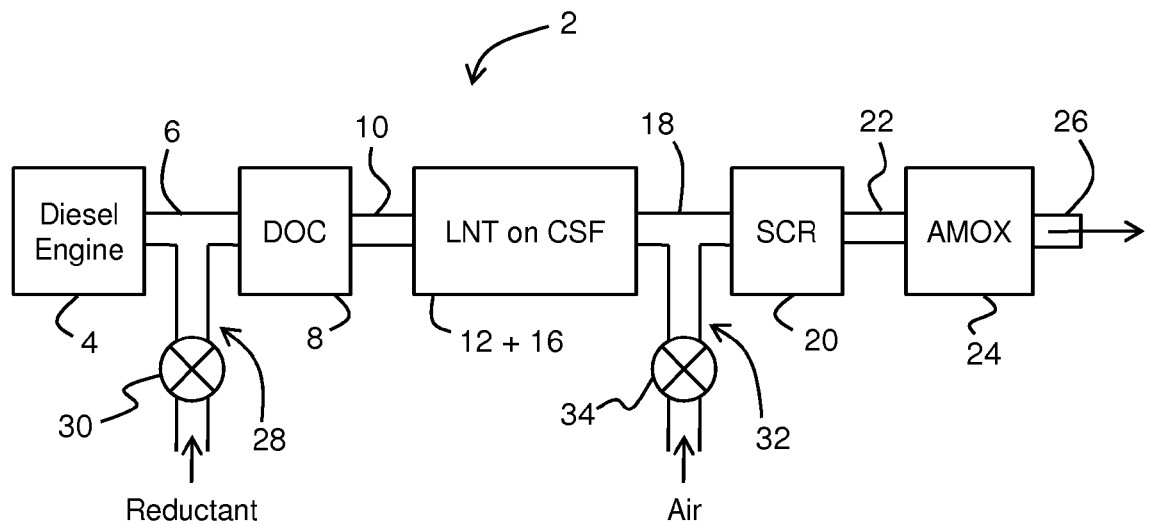
FIG. 8 is an alternative emission treatment system according to one or more embodiments of the invention.

FIGS. 3-9 show alternative emissions treatment systems in accordance with embodiments of the invention. The order of several components can be rearranged as shown in FIGS. 3-9. FIG. 4 shows an embodiment in which a in a DOC component is not included in the system and the LNT 16 is upstream of the CSF 12. FIG. 5 shows an embodiment where the CSF 12 is located at the end of the exhaust train 2 so that the exhaust stream exiting the AMOX 24 passes through the CSF 12 before exiting the system. FIG. 6 shows an embodiment similar to that of FIG. 5, except that the system in FIG. 6 does not include a DOC. FIG. 7 shows an embodiment in which the exhaust gas passes through a DOC 8 to an LNT 16 and then to a CSF 12, and air is injected by air injector 32 prior to the exhaust stream passing through SCR 20 and then AMOX 24. FIG. 8 shows an embodiment similar to that of FIG. 1 but with the LNT 16 and CSF 12 integrated into a single unit.

Figure 9:
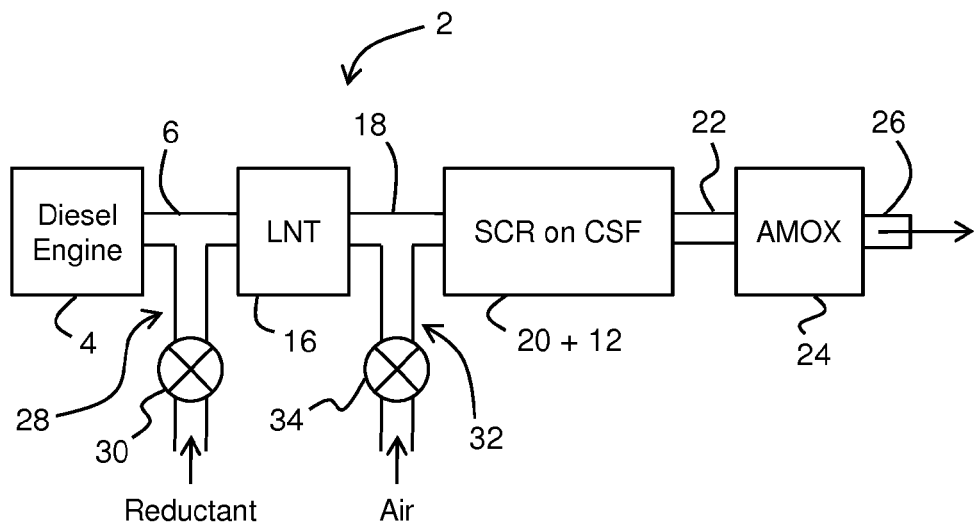
FIG. 9 is an alternative emission treatment system according to one or more embodiments of the invention.

FIG. 9 shows an embodiment in which exhaust gas exiting the LNT 16 includes air injected into the exhaust gas by the air injector 32 which then passes through an integrated SCR 20 and CSF 12 component before passing through the AMOX 24. In alternate embodiments (not shown) the AMOX 24 and CSF 12 can be integrated into a single component downstream of the air injector. In alternative embodiments (not shown) the AMOX 24, SCR 20 and CSF 12 can be integrated into a single component downstream of the air injector. It will be understood that other variants are within the scope of the invention.

Additional aspects of the invention include methods of treating an exhaust stream. In one method embodiment, an exhaust stream from a diesel or lean burn engine is passed into a lean NOx trap. Air is injected into the exhaust stream exiting the LNT via a downstream air injector which adds air to the exhaust stream. According to one or more method embodiments, of the invention, the air is injected by one or more of a valve, pump or scoop.

In one embodiment, the method includes passing the exhaust stream through a catalyzed soot filter prior to the LNT. In one or more embodiments, the method includes passing the exhaust stream through a diesel oxidation catalyst prior to the catalyzed soot filter. The optional diesel oxidation catalyst and catalyzed soot filter of detailed embodiments are integrated into a single unit, as shown in FIGS. 2 and 3.

Additional aspects of the invention include passing gas stream through an ammonia oxidation catalyst after air has been injected into the stream. Some of these aspects also pass the air injected exhaust stream through a selective catalytic reduction catalyst before passing through the ammonia oxidation catalyst.

Further aspects include injecting a reductant into the gas stream before any of the diesel oxidation catalyst, catalyzed soot filter, LNT, SCR or ammonia oxidation catalyst. The reductant, which in a detailed aspect is fuel, can be injected in one or more of the exhaust gas stream or the engine cylinder.

Substrates

In detailed embodiments, any or all of the LNT, DOC, SCR and AMOX catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

Figure 10:
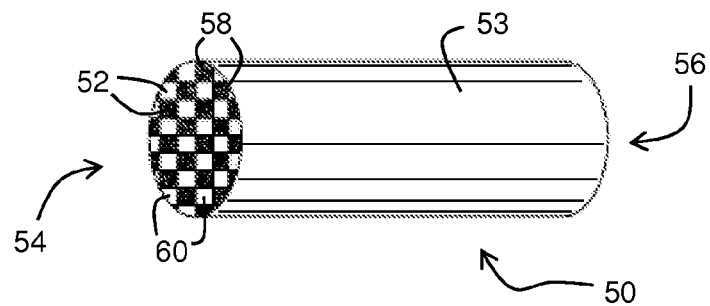
FIG. 10 is a perspective view of a wall flow filter substrate.
Figure 11:
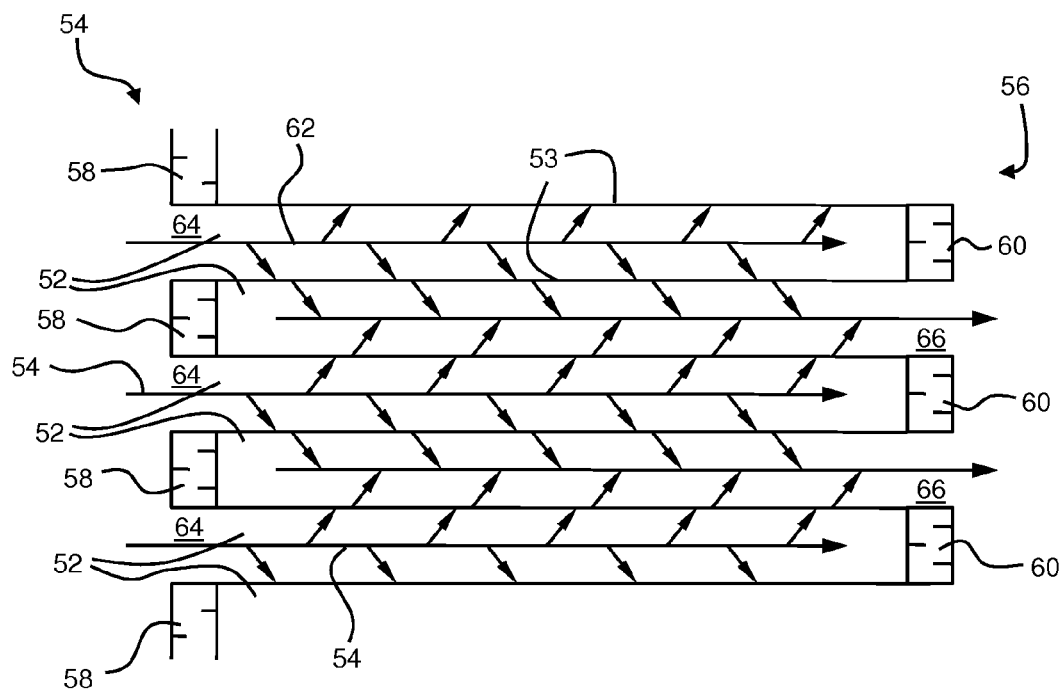
FIG. 11 is a cut-away view of a section of a wall flow filter substrate.

FIGS. 10 and 11 illustrate a wall flow filter substrate 50 which has a plurality of having alternately blocked channels 52 and can serve as a particulate filter. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs to form opposing checkerboard patterns at the inlet 54 and outlet 56. A gas stream enters through the unplugged channel inlet 60, is stopped by outlet plug and diffuses through channel walls 53 (which are porous) to the outlet side. The gas cannot pass back to the inlet side of walls because of inlet plugs 58. If such substrate is utilized, the resulting system will be able to remove particulate matters along with gaseous pollutants.

Wall flow filter substrates can be composed of ceramic-like materials such as cordierite, α-alumina, silicon carbide, aluminum titanate, silicon nitride, zirconia, mullite, spodumene, alumina-silica-magnesia or zirconium silicate, or of porous, refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity of at least 40% (e.g., from 40 to 75%) having a mean pore size of at least 10 microns (e.g., from 10 to 30 microns).

In specific embodiments where extra functionality is applied to the filter (DOC, LNT, SCR or AMOX), the substrates can have a porosity of at least 59% and have a mean pore size of between 10 and 20 microns. When substrates with these porosities and these mean pore sizes are coated with the techniques described below, adequate levels of desired catalyst compositions can be loaded onto the substrates. These substrates are still able retain adequate exhaust flow characteristics, i.e., acceptable back pressures, despite the catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 42% to 50%. In general, the pore size distribution of commercial wall flow filters is typically very broad with a mean pore size smaller than 25 microns.

The porous wall flow filter can be catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element. The filter may be coated by any of a variety of means well known to the art.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, one or all of the LNT, DOC, SCR and AMOX catalyst compositions may be deposited on an open cell foam substrate. Such substrates are well known in the art, and are typically formed of refractory ceramic or metallic materials.

The use of the LNT catalysts described herein provides a significant advantage for the design of emissions treatment systems for lean burn engines. As the LNT catalyst has both a NOx storage function during lean periods of operation and an $NH_3$ generating function during rich periods of operation, inclusion of separate catalyst substrates to perform these two functions is unnecessary. As a consequence, the burden of preparing and housing separate catalyst substrates is absent. Moreover, overall platinum group metal usage is diminished with the dual function LNT catalyst; since catalysts that promote NOx storage and catalysts that promote $NH_3$ formation both generally have platinum group metal components in their compositions. Emissions treatment systems that have a single LNT catalyst instead of separate catalysts for NOx storage and $NH_3$ formation therefore can afford the system designer with significant cost savings.

The air/fuel ratio of the exhaust gas composition may be altered to provide a rich gaseous stream by a number of methods known to those of skill in the art. Controllers that periodically operate the lean burn engine in a rich mode, or more directly alter the air/fuel ratio of the exhaust stream can be used. For instance, the air/fuel ratio can be made rich by periodically operating the engine in a rich mode using well known engine management controls. Alternatively, the exhaust gas stream may be rendered rich by periodically metering a hydrocarbon fuel (e.g., diesel fuel) upstream of the NSR catalyst. A rich gaseous exhaust stream may also be formed by adding CO and $H_2$ to the exhaust upstream of the LNT catalyst, which may be generated, for example, by treatment of a small quantity of hydrocarbon fuel in a partial oxidation reaction.

The amount of $NH_3$ produced during a rich period depends both on the length and intensity of the rich pulse used to generate the rich gaseous stream. For purposes of operating the emissions treatment system of the invention during a rich period, the rich gaseous stream generally has a $\lambda$ of from 0.80 to 0.995. In some aspects, the rich gaseous stream has a $\lambda$ of from 0.90 to 0.95. During a lean period, the lean gaseous stream preferably has a $\lambda>1.1$. The length of the rich period is generally 1 to 50% of the lean period. In specific embodiments, the length of the rich period is 2 to 10% of the lean period. Such operating parameters ensure that adequate levels of $NH_3$ are generated with minimum fuel penalty.

A component of the LNT catalyst composition that affects the quantity of $NH_3$ that forms are oxygen storage components which typically are formed from rare earth metal components. While oxygen storage components improve the desulfation capacity of the composition (which may be important for some diesel applications), too great a concentration of the oxygen storage composition limits the quantity of $NH_3$ that can be formed during rich operation. While not wishing to be bound to any specific theory, Applicants believe that the presence of oxidized species of the oxygen storage component results in oxidation of $NH_3$ to NOx or $N_2O$ during a rich period, thereby limiting the quantity of $NH_3$ that is ultimately formed by the NSR catalyst.

The LNT catalyst composites may be readily prepared by processes well known in the art. Specific LNT compositions are similar to those disclosed in U.S. Provisional Patent Application Ser. No. 61/076,560 (Wan), filed Jun. 27, 2008, which is incorporated herein by reference in its entirety. Such LNT compositions exhibit good NOx storage/NOx reduction activity at exhaust temperature of 100 to 600° C., and more particularly, at temperatures of 150 to 450° C. In addition, such LNT catalyst compositions exhibit outstanding thermal stability and the ability to remove sulfur compounds under moderate conditions.

The LNT catalyst composite can be readily prepared in layers on a monolithic honeycomb substrate. For the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide, e.g., about 0.5 to about 3.0 g/in$^3$. Components such as the platinum group metals, transition metal oxides, stabilizers, promoters and the NOx sorbent component may be incorporated in the slurry as a mixture of water soluble or water-dispersible compounds or complexes. Thereafter the coated substrate is calcined by heating, e.g., at 400 to 600° C. for 1 to 3 hours.

Typically, the platinum group metal component, e.g., platinum component, is dispersed on the refractory metal oxide, e.g., activated alumina, using a platinum group metal salt or complex (or platinum group metal precursor). For the purposes of the present invention, the term "platinum group metal precursor" means any compound, complex, or the like which, upon calcination or use thereof, decomposes or otherwise converts to a catalytically active form, usually the metal or the metal oxide. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

The emissions treatment system can use a number of known SCR catalysts to treat NOx downstream of the LNT. For instance, base metal (e.g., copper, iron) exchanged zeolite compositions or vanadia-based compositions (e.g., $V_2O_5/WO_3/TiO_2/SiO_2$) can be used to form the SCR catalyst. The SCR catalyst can be in the form of self supporting catalyst particles or as a honeycomb monolith formed of the SCR catalyst composition. In preferred embodiments of the invention however, the NSR catalyst composition is disposed as a washcoat or as a combination of washcoats on a ceramic or metallic substrate, preferably a honeycomb flow through substrate.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An emissions treatment system for NOx abatement in a diesel exhaust stream from a diesel engine, comprising:
   a lean NOx trap (LNT) located downstream of the engine;
   an air injector to reduce hydrocarbons located downstream of the NOx trap; and
   a selective catalytic reduction (SCR) catalyst located downstream of the air injector, wherein when the diesel engine is operated in a rich mode, HC and CO and $NH_3$ generated over the LNT exit the LNT, the $NH_3$ is used to reduce NOx over the SCR catalyst and the HC and CO emitted during the rich mode are oxidized by the injected air.

2. The emissions treatment system of claim 1, wherein the air injector is one or more of a valve, pump or scoop.

3. The emissions treatment system of claim 1, further comprising a catalyzed soot filter.

4. The emissions treatment system of claim 3, further comprising a diesel oxidation catalyst located upstream of the catalyzed soot filter.

5. The emissions treatment system of claim 4, wherein the diesel oxidation catalyst is integrated with the catalyzed soot filter.

6. The emission treatment system of claim 3, wherein the lean NOx trap is integrated with the catalyzed soot filter.

7. The emissions treatment system of claim 1, further comprising an ammonia oxidation (AMOX) catalyst located downstream of the air injector to reduce ammonia slipping from the LNT.

8. The emissions treatment system of claim 7, further comprising a catalyzed soot filter located downstream of the air injector.

9. The emission treatment system of claim 8, wherein the SCR catalyst is integrated with the catalyzed soot filter.

10. The emission treatment system of claim 8, wherein the AMOX catalyst is integrated with the catalyzed soot filter.

11. The emission treatment system of claim 8, wherein both the SCR catalyst and the AMOX catalyst are integrated with the catalyzed soot filter.

12. The emissions treatment system of claim 7, further comprising a reductant injector located upstream of the LNT.

13. The emissions treatment system of claim 12, wherein the reductant injector is adapted to inject fuel into the exhaust stream or an engine cylinder.

14. The emissions treatment system of claim 1, wherein the LNT is adapted to form ammonia in situ.

15. A method for abating NOx in an exhaust stream from a lean burn engine comprising: operating the engine in a rich mode, passing the emission stream through a lean NOx trap (LNT) causing the emission of HC and CO and generating $NH_3$ over the LNT, periodically regenerating the LNT by creating a reducing atmosphere, injecting air in the exhaust stream exiting the LNT, passing the air exhaust stream containing injected air through a selective catalytic reduction catalyst, wherein the HC and CO emitted during the rich mode are oxidized by the injected air.

16. The method of claim 15, further comprising passing the exhaust stream through a catalyzed soot filter prior to the LNT.

17. The method of claim 16, further comprising passing the exhaust stream through a diesel oxidation catalyst prior to the catalyzed soot filter.

18. The method of claim 17, wherein the diesel oxidation catalyst is integrated with the catalyzed soot filter.

19. The method of claim 15, further comprising passing the exhaust stream containing injected air through an ammonia oxidation catalyst after passing the exhaust stream through the SCR catalyst.

* * * * *

UNITED STATES PATENT AND TRADEMARK OFFICE
CERTIFICATE OF CORRECTION

| | | |
|---|---|---|
| PATENT NO. | : 9,453,443 B2 | Page 1 of 1 |
| APPLICATION NO. | : 12/727473 | |
| DATED | : September 27, 2016 | |
| INVENTOR(S) | : Kumar et al. | |

It is certified that error appears in the above-identified patent and that said Letters Patent is hereby corrected as shown below:

In the Specification

At Column 2, Line 36, formula (7) "$CO + H_2O \rightarrow H_2 \rightarrow CO_2$" should be changed to -- $CO + H_2O \rightarrow H_2 + CO_2$ --

In the Claims

At Column 12, Claim 15, Line 37, the text "stream exiting the LNT, passing the air exhaust stream" should be changed to -- stream exiting the LNT, passing the exhaust stream --

Signed and Sealed this
Fourth Day of July, 2017

Joseph Matal
*Performing the Functions and Duties of the
Under Secretary of Commerce for Intellectual Property and
Director of the United States Patent and Trademark Office*